(12) United States Patent
Yamasaki

(10) Patent No.: US 9,187,027 B2
(45) Date of Patent: Nov. 17, 2015

(54) VEHICLE HEADLIGHT

(71) Applicant: Fuji Jukogyo Kabushiki Kaisha, Tokyo (JP)

(72) Inventor: Kentarou Yamasaki, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/314,372

(22) Filed: Jun. 25, 2014

(65) Prior Publication Data

US 2015/0003086 A1    Jan. 1, 2015

(30) Foreign Application Priority Data

Jun. 26, 2013 (JP) ................................. 2013-133682

(51) Int. Cl.
   *B60Q 1/08*    (2006.01)
   *F21S 8/10*    (2006.01)
   *B60Q 1/18*    (2006.01)

(52) U.S. Cl.
   CPC *B60Q 1/085* (2013.01); *B60Q 1/18* (2013.01); *F21S 48/1736* (2013.01); *B60Q 2300/45* (2013.01)

(58) Field of Classification Search
   CPC .. F21V 14/02; F21S 48/1742; F21S 48/1736; B60Q 1/085; B60Q 1/18; B60Q 1/45
   See application file for complete search history.

(56) References Cited

U.S. PATENT DOCUMENTS

| | | | |
|---|---|---|---|
| 6,281,806 B1* | 8/2001 | Smith et al. | 340/901 |
| 2001/0019483 A1 | 9/2001 | Takada | |
| 2002/0057572 A1* | 5/2002 | Kondo et al. | 362/460 |
| 2007/0102214 A1* | 5/2007 | Wittorf et al. | 180/167 |
| 2009/0196061 A1* | 8/2009 | Nakamura et al. | 362/523 |
| 2013/0076240 A1* | 3/2013 | Endo et al. | 315/82 |
| 2013/0286672 A1* | 10/2013 | Godecker et al. | 362/466 |
| 2013/0343071 A1* | 12/2013 | Nagaoka et al. | 362/466 |
| 2014/0185307 A1* | 7/2014 | Lee et al. | 362/465 |

FOREIGN PATENT DOCUMENTS

| | | |
|---|---|---|
| JP | A2001-195910 | 7/2001 |
| JP | 2006-012450 | 1/2006 |
| JP | 2007-038877 | 2/2007 |
| JP | 2010-182587 | 8/2010 |
| JP | 2010-184625 | 8/2010 |
| JP | A2011-003515 | 1/2011 |
| JP | A2011-161035 | 8/2011 |

* cited by examiner

Primary Examiner — Anne Hines
(74) Attorney, Agent, or Firm — Troutman Sanders LLP

(57) ABSTRACT

A vehicle headlight includes: a first illuminator that illuminates a predetermined region ahead of a vehicle with a first light distribution pattern having a cutoff line at an upper end; a second illuminator that illuminates, with a second light distribution pattern, a region near the vehicle on a lower side of the cutoff line of the first light distribution pattern and further toward an outer side in a width direction than a side end of the first light distribution pattern; a target detector that detects a target adjacent to a driving lane ahead of the vehicle with a possibility of movement; and an illumination controller that performs illumination with the second illuminator over a predetermined time after the target has been detected and then terminates the illumination by the second illuminator.

12 Claims, 8 Drawing Sheets

VEHICLE HEADLIGHT

CROSS-REFERENCE TO RELATED APPLICATIONS

The present application claims priority from Japanese Patent Application No. 2013-133682 filed on Jun. 26, 2013, the entire contents of which are hereby incorporated by reference.

BACKGROUND

1. Technical Field

The present invention relates to a headlight provided to a vehicle such as an automobile, and particularly relates to a vehicle headlight with which visibility of a target, upon passing by the target adjacent to a driving lane of a vehicle, is improved.

2. Related Art

A headlight of a vehicle such as an automobile projects light emitted from a light source such as, for instance, an incandescent light bulb, discharge lamp, and LED with a projection optical system such as a projector and a reflective optical system such as a reflector.

With such a headlight, switching is possible between a driving beam (high beam) for use during normal driving and a passing beam (low beam) for use when passing an oncoming vehicle.

In order to prevent glare that dazzles an oncoming driver, a cutoff line is formed in a predetermined range at the upper edge of a light distribution pattern for the passing beam, such that light is substantially not radiated above the cutoff line.

In such a headlight, it is known that a desired light distribution pattern is formed through collaborative use of a plurality of light sources or optical systems.

For instance, Japanese Unexamined Patent Application Publication (JP-A) No. 2011-3515 describes that a main light distribution pattern or the like having a cutoff line is formed by a projector unit and a diffused light distribution pattern is formed by a reflector unit.

JP-A No. 2011-161035 describes that a part of a beam emitted by a light source of a projector unit is guided to a reflector by a mirror member to illuminate a shoulder or the like on the driving lane side.

JP-A No. 2001-195910 describes a technique in which an auxiliary light distribution pattern for a passing beam from a projector unit is formed by an auxiliary reflector.

A general light distribution pattern for a passing beam enables a target such as a pedestrian and bicycle beside a driving lane to be illuminated, in the case where the distance from a vehicle is sufficiently far. However, when the vehicle and the pedestrian or the like are in proximity, the pedestrian or the like falls outside the light distribution pattern. Therefore, there have been cases where the pedestrian or the like is not sufficiently visible upon passing, rendering it difficult to perform an appropriate check on whether the path is clear or the like.

SUMMARY OF THE INVENTION

The present invention has been designed in consideration of the circumstances described above, and an object thereof is to provide a vehicle headlight that improves visibility of a target upon passing by the target beside a driving lane of a vehicle.

A first aspect of the present invention provides a vehicle headlight including: a first illuminator that illuminates a predetermined region ahead of a vehicle with a first light distribution pattern having a cutoff line at an upper end; a second illuminator that illuminates, with a second light distribution pattern, a region near the vehicle on a lower side of the cutoff line of the first light distribution pattern and further toward an outer side in a width direction than a side end of the first light distribution pattern; a target detector that detects a target adjacent to a driving lane ahead of the vehicle with a possibility of movement; and an illumination controller that performs illumination with the second illuminator over a predetermined time after the target has been detected and then terminates the illumination by the second illuminator.

The target may include at least one of a pedestrian, a bicycle, and a stopped vehicle.

The first illuminator may include a projector unit including a projection optical system, and the second illuminator may include a reflector unit including a reflective optical system.

The vehicle headlight may further include a third illuminator that illuminates, with a third light distribution pattern, a region at or outside a predetermined horizontal angle from an elbow point of the cutoff line of the first light distribution pattern and above an upper edge of the first light distribution pattern. The target detector may detect the target based on an image taken by an imaging unit of which an imaging range includes at least a region included in the third light distribution pattern. The illumination controller may perform illumination with the second illuminator in a case where the target has been detected within a region illuminated by the third light distribution pattern.

The third illuminator may include a reflector unit including a reflective optical system.

The vehicle headlight may further include a target proximity determining unit that determines whether the target is in proximity to the vehicle based on information relating to the target detected by the target detector. The illumination controller may perform illumination with the second illuminator in a case where the target is determined to be in proximity to the vehicle.

DETAILED DESCRIPTION

In the present invention, the object of providing a vehicle headlight with which visibility of a target upon passing by the target beside a driving lane of a vehicle is improved is achieved by providing a third illuminator that radiates light on the outside of a predetermined horizontal range and above a cutoff line of a first illuminator and causing a second illuminator to illuminate the side near the vehicle in the case where an imaging unit has detected a pedestrian or the like within a light distribution pattern of the third illuminator.

An example of a vehicle headlight to which the present invention is applied will be described below.

The vehicle headlight (hereinafter referred to as simply as "headlight") in the example is provided to the front end of a body of a vehicle such as a passenger car.

Figure 1:
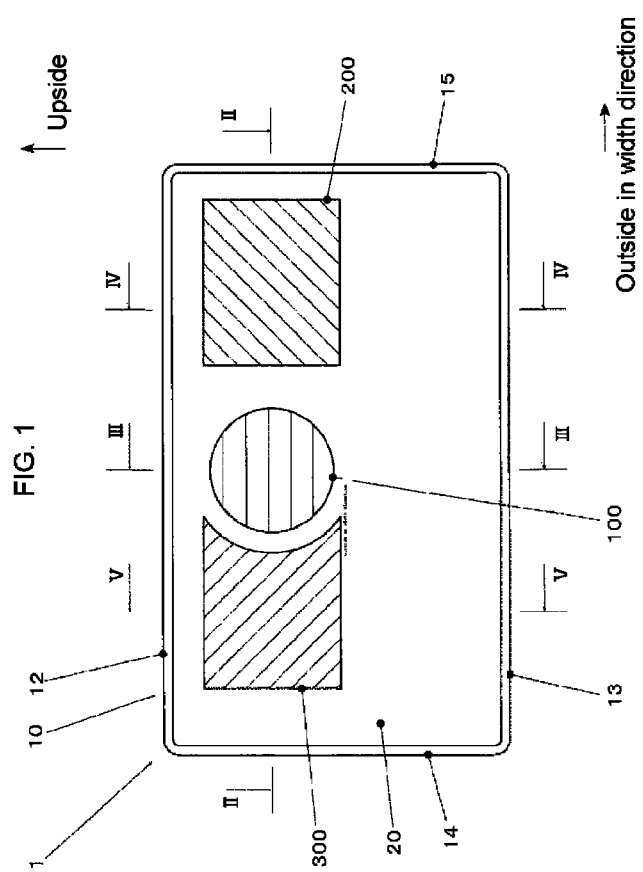
FIG. 1 is a view of a vehicle headlight according to an example of the present invention when seen from the front.

FIG. 1 is a view of the headlight in the example when seen from the front.

Figure 2:
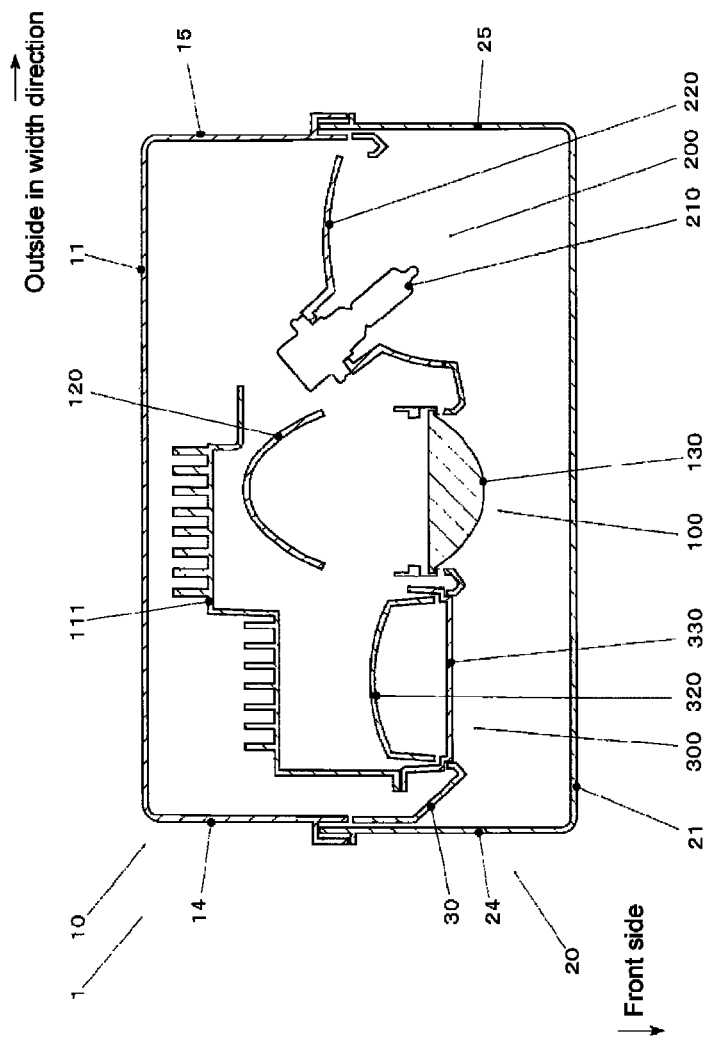
FIG. 2 is a sectional view along line II-II in FIG. 1.
Figure 3:
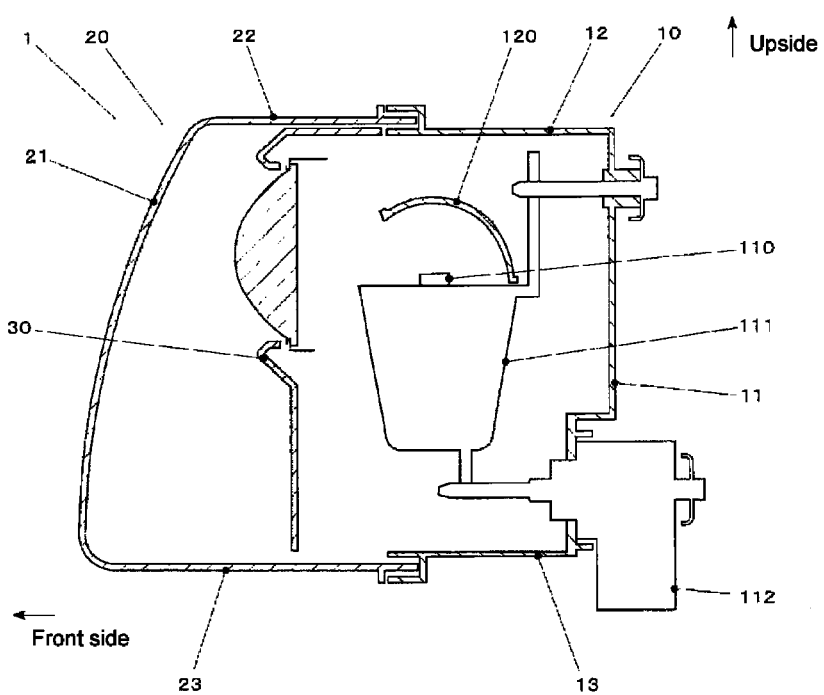
FIG. 3 is a sectional view along line III-III in FIG. 1.
Figure 4:
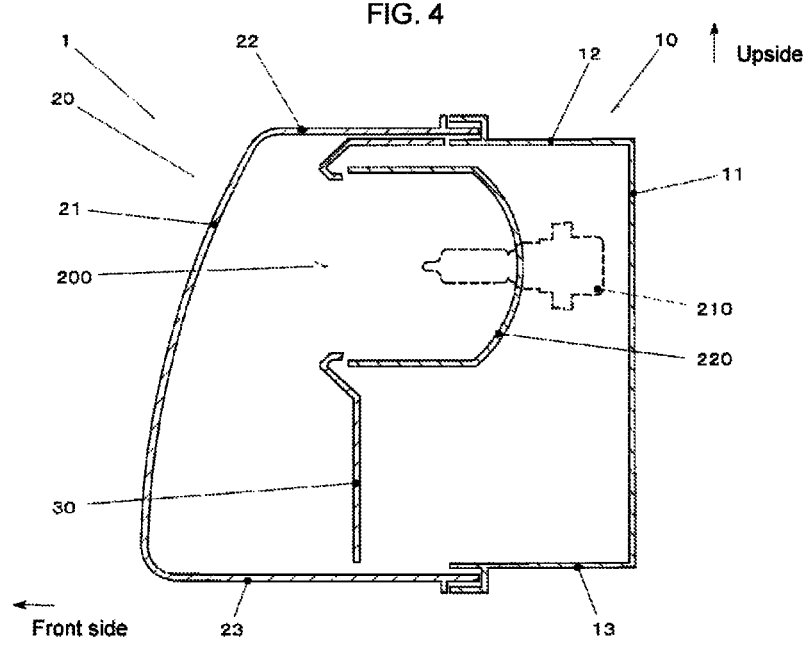
FIG. 4 is a sectional view along line IV-IV in FIG. 1.
Figure 5:
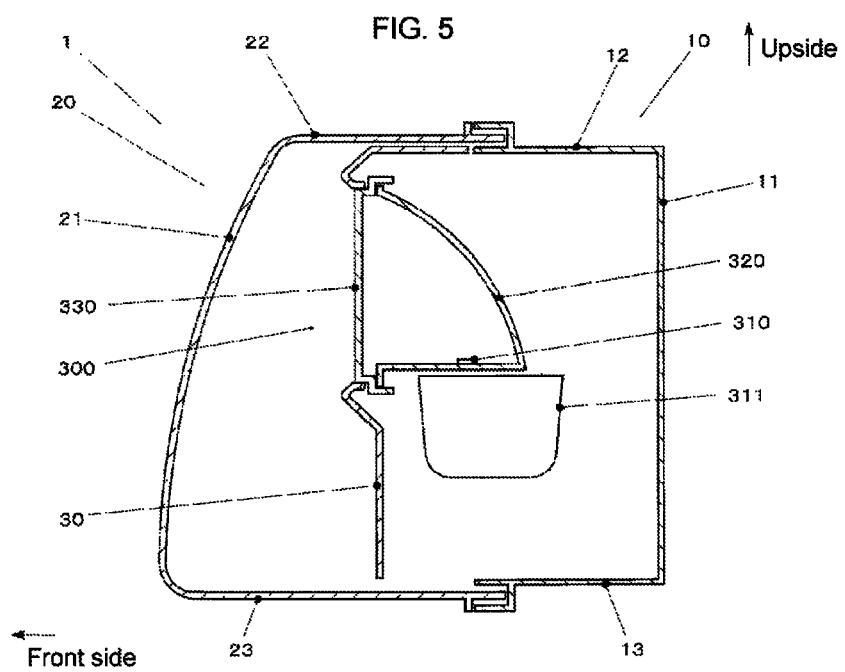
FIG. 5 is a sectional view along line V-V in FIG. 1.

FIG. 2 is a sectional view along line II-II in FIG. 1.
FIG. 3 is a sectional view along line III-III in FIG. 1.
FIG. 4 is a sectional view along line IV-IV in FIG. 1.
FIG. 5 is a sectional view along line V-V in FIG. 1.

Headlights 1 are provided in a pair to the front end of the body with an interval in the width direction.

The headlight 1 includes a housing 10, an outer lens 20, a bezel extension 30, a first unit 100, a second unit 200, a third unit 300, and the like.

The housing 10 is a case housing the respective units 100, 200, and 300.

The housing 10 is formed in a box shape having an opening on the front side through injection molding with a resin material, for instance.

The housing 10 includes a back surface 11, an upper surface 12, a lower surface 13, side surfaces 14 and 15, and the like.

The back surface 11 is a surface on the rear side of the housing 10 and is formed in a flat shape extending approximately along the width direction and the vertical direction.

The shape of the back surface 11 when seen from the front is substantially a wide rectangle.

The upper surface 12, the lower surface 13, the side surfaces 14 and 15 have a flat shape and protrude to the front side respectively from the upper end, the lower end, and the side ends of the back surface 11.

The outer lens 20 closes the opening on the front side of the housing 10 and covers the front surface of the respective units 100, 200, and 300.

The outer lens 20 is formed integrally of a transparent resin material.

The outer lens 20 includes a front surface 21, an upper surface 22, a lower surface 23, side surfaces 24 and 25, and the like.

The front surface 21 is a design surface exposed on the outside in a convex shape that protrudes to the front side with an inclination such that the upper end is receded further toward the rear side than the lower end.

The upper surface 22, the lower surface 23, and the side surfaces 24 and 25 have a flat shape and protrude to the rear side respectively from the upper end, the lower end, and the side ends of the front surface 21.

The rear edges of the upper surface 22, the lower surface 23, and the side surfaces 24 and 25 are inserted to an engagement groove formed at the front edge of the upper surface 12, the lower surface 13, and the side surfaces 14 and 15 of the housing 10.

The bezel extension 30 is a design component on the inside (rear side) of the outer lens 20 and is provided with an opening in which lenses for respective units 100, 200, and 300 or the like are disposed.

The first unit 100 is an illuminator (projector unit) that projects light emitted by an LED light source 110 to a predetermined region on the front side with a reflector 120 and a projection optical system 130.

The LED light source 110 is, for instance, a white LED and includes a heat sink 111, an optical-axis adjustment actuator 112, and the like.

The heat sink 111 releases heat generated by the LED light source 110 from a radiation fin protruding to the rear side and also acts as a base on which the LED light source 110 is installed.

As shown in FIG. 2, a part of the heat sink 111 extends to the rear of the third unit 300.

The LED light source 110 is placed on the upper surface of the heat sink 111.

The upper end of the heat sink 111 is swingably attached to the back surface 11 of the housing 10.

The lower end of the heat sink 111 is attached to the back surface 11 through the optical-axis adjustment actuator 112.

The optical-axis adjustment actuator 112 tilts the optical axis of the first unit 100 in the vertical direction by causing displacement of the lower end of the heat sink 111 in the front-back direction.

The reflector 120 is a parabolic reflector that covers from above the LED light source 110 installed on the upper surface of the heat sink 111.

With the reflector 120, light from the LED light source 110 is collected and reflected to the front side into the projection optical system 130.

The projection optical system 130 is provided with a shade having a shape corresponding to a cutoff line. By projecting an enlarged image of the shade to the front side, a cutoff line in a light distribution pattern P1 (see FIG. 6) is formed.

As shown in FIG. 1, the shape of the projection optical system 130 when seen from the front is substantially a circle.

The second unit 200 is an illuminator (reflector unit) that radiates light emitted by a bulb 210 to a predetermined region ahead of the vehicle and toward the outside in the width direction with a reflector 220.

The second unit 200 is disposed beside the first unit 100 to be on the outside in the width direction.

The bulb 210 is, for instance, an incandescent light bulb such as a halogen bulb and a high-intensity discharge bulb such as an HID bulb.

The bulb 210 is inserted to an opening formed in the middle of the reflector 220 such that a light emitting portion is near the focal point of the reflector 220.

The reflector 220 is a parabolic reflector of which the reflecting surface that is a concave surface faces the front side.

Figure 6:
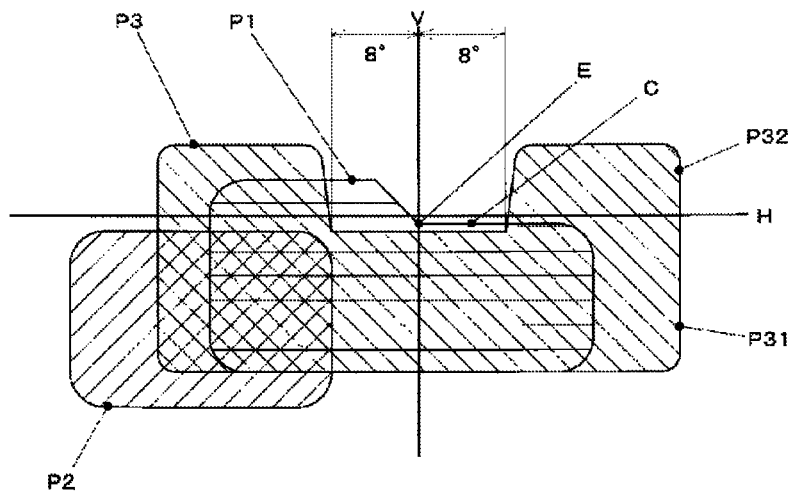
FIG. 6 is a view illustrating light distribution patterns of the vehicle headlight in the example.

The reflector 220 reflects light from the bulb 210 and projects light to the front in a predetermined light distribution pattern P2 (see FIG. 6).

As shown in FIG. 1, the shape of the reflector 220 of the second unit 200 when seen from the front is substantially a rectangle.

The third unit 300 is an illuminator (reflector unit) that radiates light emitted by an LED light source 310 to a predetermined region ahead of the vehicle with a reflector 320.

The third unit 300 is disposed beside the first unit 100 to be on the inside in the width direction.

The LED light source 310 is, for instance, a white LED and includes a heat sink 311.

The heat sink 311 releases heat generated by the LED light source 310 from a radiation fin and also acts as a base on which the LED light source 310 is installed.

The LED light source 310 is placed on the upper surface of the heat sink 311.

The reflector 320 is a parabolic reflector that covers from above the LED light source 310 installed on the upper surface of the heat sink 311.

The reflector 320 reflects light from the LED light source 310 and projects light to the front via an inner lens 330 in a predetermined light distribution pattern P3 (see FIG. 6).

The inner lens 330 is disposed within an opening of the bezel extension 30 on the front side of the reflector 320.

The inner lens 330 is formed substantially of a flat transparent plate.

As shown in FIG. 1, the shape of the inner lens 330 when seen from the front is substantially a rectangle with a cutout along an arc concentric with the first unit 100 in a portion beside the first unit 100.

Next, the light distribution pattern formed by the headlight 1 will be described.

FIG. 6 is a view illustrating the light distribution patterns of the headlight 1. The V-axis and the H-axis respectively represent a vertical line and a horizontal line.

FIG. 6 illustrates a state of a passing beam (low beam) where light is projected on a flat surface disposed along the vertical direction and the width direction to face the vehicle from the front side.

FIG. 6 illustrates a case of left-hand traffic as one example and is mirror-reversed in the case of right-hand traffic.

The first unit 100, the second unit 200, and the third unit 300 respectively form the light distribution patterns P1, P2, and P3.

The light distribution pattern P1 is formed substantially in a rectangular shape having alongside along the width direction and includes a cutoff line C at the upper end.

The light distribution pattern P1 is intended to ensure long-distance visibility along the center on a driving lane of the vehicle, and is a main light distribution pattern that meets the standards for light distribution based on regulations in, for instance, Japan, Europe, China, and the US.

In the middle (along the traveling direction of the vehicle) of a cutoff line C in the left-right direction, an elbow point E at which there is an upward fold from the horizontal is provided.

On the oncoming lane side (right side in the case of left-hand traffic and left side in the case of right-hand traffic) of the elbow point E, the cutoff line C is along the horizontal direction and in a position lower than a horizontal plane passing through the center of the headlight 1, so that light above the cutoff line C is substantially blocked.

On the non-oncoming lane side (left side in the case of left-hand traffic and right side in the case of right-hand traffic) of the elbow point E, the upper end of the light distribution pattern P1 is in a step shape and higher than on the oncoming lane side. In a region adjacent to the elbow point E, the cutoff line is inclined such that the non-oncoming lane side is higher.

In a region on the non-oncoming lane side of the elbow point E, the upper end of the light distribution pattern P1 is above the horizontal plane passing through the center of the headlight 1.

The light distribution pattern P2 is formed substantially in a rectangular shape having a long side along the width direction to implement illumination downwards and toward the outer side in the width direction (left side for the left-side headlight and right side for the right-side headlight) with respect to the light distribution patterns P1 and P3, and light is radiated toward the left and right near the vehicle relative to the light distribution patterns P1 and P3.

A region of the light distribution pattern P2 in the upper part and toward the inside in the width direction overlaps with the light distribution patterns P1 and P3.

The light distribution pattern P3 includes upper portions P32 that extend upward respectively from left and right end portions of a lower portion P31 formed substantially in a rectangular shape having a long side along the width direction.

On the oncoming lane side of the elbow point E of the light distribution pattern P1, the upper end of the lower portion P31 is lower than the cutoff line C.

The middle portion of the lower portion P31 in the left-right direction overlaps with the light distribution pattern P1.

The side end portions of the lower portion P31 extend to the left and right relative to the side ends of the light distribution pattern P1.

The lower end of the lower portion P31 is substantially at the same height as the lower end of the light distribution pattern P1 and extends horizontally.

The upper portion P32 is substantially a rectangular region that extends upward from the upper end of the lower portion P31.

The upper portion P32 can illuminate a pedestrian or the like present on a shoulder about 30 m ahead, for instance.

The upper end of the upper portion P32 is higher than the upper end of the light distribution pattern P1.

For compliance with regulations or the like, the upper portion P32 is disposed so as not to exhibit a predetermined angle or less (e.g., 8° or less) in respective width directions with respect to the elbow point E of the light distribution pattern P1.

The side end of the upper portion P32 on the opposite side of the elbow point E is on the same straight line along the vertical direction as the side end of the lower portion P31.

Next, a control system of the headlight 1 and the operation thereof will be described.

Figure 7:
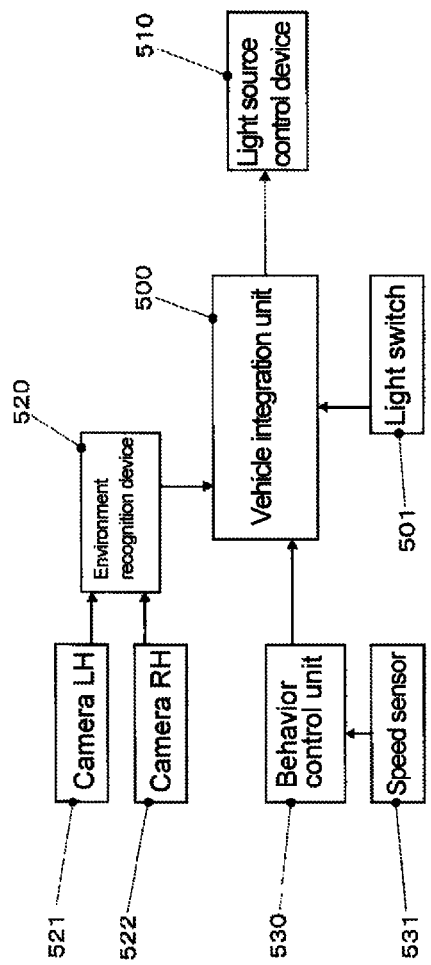
FIG. 7 is a block diagram illustrating the configuration of a control system of the vehicle headlight in the example.

FIG. 7 is a block diagram illustrating the configuration of the control system of the headlight.

The control system of the headlight 1 includes a vehicle integration unit 500, a light source control device 510, an environment recognition device 520, a behavior control unit 530, and the like.

These are capable of communication via an in-vehicle LAN such as, for instance, a CAN communication system.

The vehicle integration unit 500 is for overall control of various electrical components such as lights provided to the vehicle.

The vehicle integration unit 500 gives a control signal with respect to the light source control device 510 to separately control the first unit 100, the second unit 200, and the third unit 300 to be on or off.

The vehicle integration unit 500 is connected with a light switch 501.

The light switch 501 is an operation unit with which a driver switches the headlight 1 on or off and switches between high beam (driving beam) and low beam (passing beam) when the headlight 1 is on.

The light source control device 510 includes a controller or the like that controls relay for performing power supply or shutoff with respect to the LED light source 110, the bulb 210, and the LED light source 310 of the respective units 100, 200, and 300 of the headlight 1 and the lighting state of each light source.

The environment recognition device 520 detects the shape of a lane ahead of the vehicle or the type, position, or the like of an obstacle using a known stereo image processing technique with a stereo camera formed of a camera LH 521 and a camera RH 522.

The camera LH 521 and the camera RH 522 are imaging units disposed, for instance, at the upper end of a windshield (near a rear-view mirror) of the vehicle with an interval in the left-right direction.

The environment recognition device 520 recognizes an obstacle or the like based on an image taken by the camera LH 521 and the camera RH 522 and performs stereo image processing in which disparity between the respective cameras is used to calculate the distance from the vehicle with the principle of triangulation.

Through time-series imaging in the forward direction of the vehicle at predetermined intervals, the camera LH 521 and the camera RH 522 output a pair of images as a stereo image as needed.

The environment recognition device 520 performs stereo image processing for each stereo image and generates a distance image.

The distance image is defined as a set of distance values (disparities) associated with a position in an image plane. The amount of difference in the horizontal direction between correlating pixel blocks in the left and right images is the disparity.

Based on the disparity, the environment recognition device 520 calculates the distance of an object of in pixel block from the vehicle.

The environment recognition device 520 detects a group of adjacent pixels having substantially equal distance values as an object and determines the type of the object based on the size in the height direction and width direction or the contour shape.

The types of an object include vehicle, pedestrian, and bicycle.

In this manner, the environment recognition device 520 is capable of detecting the relative position of a pedestrian within an imaging range of the camera LH 521 and the camera RH 522 with respect to the vehicle.

The environment recognition device 520 provides the detected relative positions of the pedestrian with respect to the vehicle to the vehicle integration unit 500 in sequence.

The behavior control unit 530 performs behavior control in which a difference in braking force between left and right wheel brakes is caused to generate yaw moment in a direction to suppress a behavior or antilock brake control, in the case where a behavior such as understeer or oversteer has occurred in the vehicle.

The behavior control unit 530 is connected with a speed sensor 531.

The speed sensor 531 is provided to a wheel hub to generate a speed pulse signal according to the rotational speed of a wheel.

The behavior control unit 530 provides the driving speed (speed) of the vehicle calculated based on the speed pulse signal of the speed sensor 531 to the vehicle integration unit 500.

Figure 8:
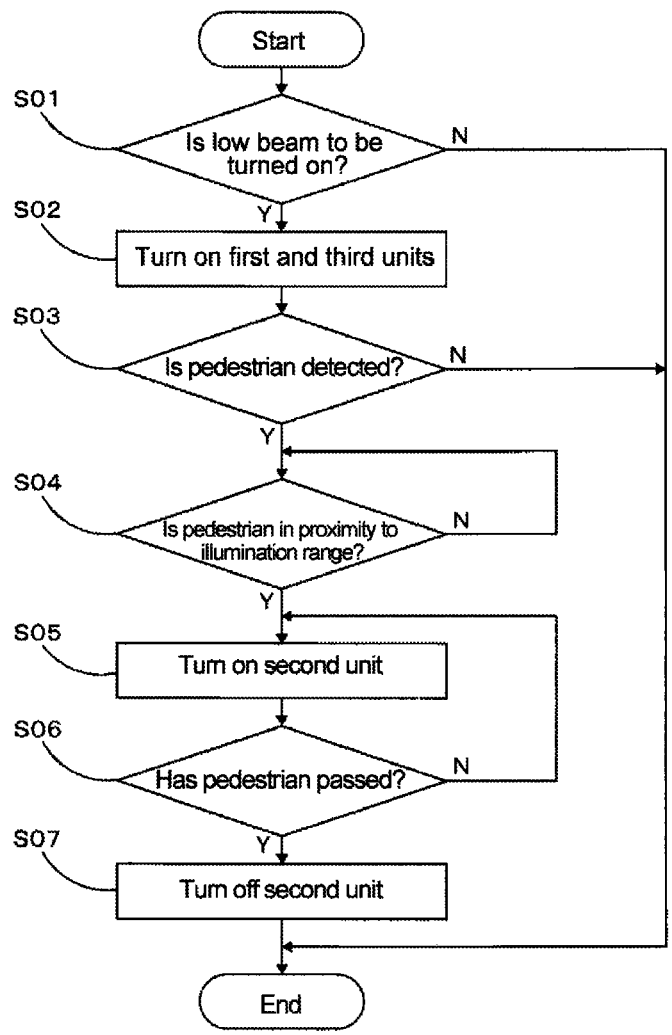
FIG. 8 is a flowchart illustrating the operation of the control system of the vehicle headlight in the example.

FIG. 8 is a flowchart showing the operation of the control system described above.

Each step will be described below in order.

<Step S01: Determining Whether to Turn on Low Beam>

The vehicle integration unit 500 determines whether or not an operation of selecting low beam to be turned on is performed with the light switch 501. In the case where low beam is selected to be turned on, step S02 is performed.

Otherwise, the process is terminated (returned).

<Step S02: Turning on First and Third Units>

The vehicle integration unit 500 gives a control signal to the light source control device 510 to bring the first unit 100 and the third unit 300 to an on-state and bring the second unit 200 to an off-state.

Then, step S03 is performed.

<Step S03: Determining Whether Pedestrian is Detected>

The vehicle integration unit 500 determines whether or not the environment recognition device 520 has detected a pedestrian beside a driving lane ahead of the vehicle. In the case where a pedestrian is detected, step S04 is performed.

In the case where a pedestrian is not detected, the process is terminated (returned).

<Step S04: Determining Whether Pedestrian is in Proximity>

Based on the distance of the pedestrian detected by the environment recognition device 520 from the vehicle and the speed detected by the speed sensor 531, the vehicle integration unit 500 calculates the estimated time before the pedestrian comes into a range that can be illuminated with the light distribution pattern P2 of the second unit 200.

The vehicle integration unit 500 determines whether or not the estimated time has elapsed. In the case where the estimated time has elapsed, step S05 is performed.

In the case where the estimated time has not elapsed, processing of step S04 and thereafter are repeated.

<Step S05: Turning on Second Unit>

The vehicle integration unit 500 gives a control signal to the light source control device 510 to bring the second unit 200 to an on-state.

Accordingly, the first unit 100, the second unit 200, and the third unit 300 of the headlight are all in an on-state.

Then, step S06 is performed.

<Step S06: Determining Whether Pedestrian has Passed>

Based on the distance of the pedestrian detected by the environment recognition device 520 in step S03 from the vehicle and the speed detected by the speed sensor 531, the vehicle integration unit 500 determines whether or not the vehicle has already passed by the pedestrian.

In the case where the vehicle has already passed by the pedestrian, step S07 is performed.

Otherwise, processing of step S05 and thereafter are repeated.

<Step S07: Turning on Third Unit>

The vehicle integration unit 500 gives a control signal to the light source control device 510, turns off the second unit 200, and terminates the process.

With the example described above, the following effects can be obtained.

(1) In the case where the environment recognition device 520 has detected a pedestrian, the visibility of the pedestrian can be increased to enable easy monitoring on whether the path is clear or the like, by turning on the second unit 200 that illuminates the side near the vehicle with a diffused light distribution from the reflector 220.

(2) By providing the third unit 300 that radiates light, with a diffused light distribution from the reflector 320, above the light distribution pattern P1 such that a range is at 8° or greater to the left and right with respect to the elbow point E of the cutoff line C of the light distribution pattern P1 of the first unit 100, a distant pedestrian can be illuminated over a wide range to detect the pedestrian at an early point.

(3) By calculating the time before the detected pedestrian can be illuminated by the second unit 200 based on the distance between the pedestrian and the vehicle and the speed to set the period in which the second unit 200 is turned on, the second unit 200 can be turned on at an appropriate timing.

MODIFIED EXAMPLE

The present invention is not limited to the example described above. Various modifications and changes are possible and within the technical scope of the present invention.

(1) The shape, structure, material, manufacturing method, and the like of each component forming the headlight are not limited to the configuration of the example described above, and may be changed appropriately.

(2) In the example, the respective units each include an independent light source. However, light emitted from a single light source may be used by a plurality of units. For instance, a common light source may be used by the first unit 100 and the third unit 300 that are turned on and off simultaneously.

The type of a light source is also not particularly limited.

(3) In the example, lighting control of the second unit is performed upon detection of a pedestrian. However, a similar control may be performed in accordance with the detection of a target other than a pedestrian, such as a bicycle or another vehicle waiting to enter the driving lane of the vehicle.

The technique of detection is also not limited to that with a stereo camera in the example, and other techniques are acceptable.

The invention claimed is:

1. A vehicle headlight comprising:
    a first illuminator that illuminates a predetermined region ahead of a vehicle with a first light distribution pattern having a cutoff line at an upper end;
    a second illuminator that illuminates, with a second light distribution pattern, a region near the vehicle on a lower side of the cutoff line of the first light distribution pattern and further toward an outer side in a width direction than a side end of the first light distribution pattern;
    a target detector that detects a target adjacent to a driving lane ahead of the vehicle with a possibility of movement;
    a target proximity determining unit that determines whether the target is in proximity to the vehicle based on information relating to the target detected by the target detector; and
    an illumination controller to start illumination with the second illuminator after the proximity of the target to an illumination range of the second illuminator is detected and to terminate the illumination with the second illuminator after the vehicle passes by the target.

2. The vehicle headlight according to claim 1, wherein the target includes at least one of a pedestrian, a bicycle, and a stopped vehicle.

3. The vehicle headlight according to claim 2, wherein the first illuminator includes a projector unit including a projection optical system; and
    the second illuminator includes a reflector unit including a reflective optical system.

4. The vehicle headlight according to claim 3, further comprising a third illuminator that illuminates, with a third light distribution pattern, a region at or outside a predetermined horizontal angle from an elbow point of the cutoff line of the first light distribution pattern and above an upper edge of the first light distribution pattern, wherein
    the target detector detects the target based on an image taken by an imaging unit of which an imaging range includes at least a region included in the third light distribution pattern, and
    the illumination controller performs illumination with the second illuminator in a case where the target has been detected within a region illuminated by the third light distribution pattern.

5. The vehicle headlight according to claim 4, wherein the third illuminator includes a reflector unit including a reflective optical system.

6. The vehicle headlight according to claim 2, further comprising a third illuminator that illuminates, with a third light distribution pattern, a region at or outside a predetermined horizontal angle from an elbow point of the cutoff line of the first light distribution pattern and above an upper edge of the first light distribution pattern, wherein
    the target detector detects the target based on an image taken by an imaging unit of which an imaging range includes at least a region included in the third light distribution pattern, and
    the illumination controller performs illumination with the second illuminator in a case where the target has been detected within a region illuminated by the third light distribution pattern.

7. The vehicle headlight according to claim 6, wherein the third illuminator includes a reflector unit including a reflective optical system.

8. The vehicle headlight according to claim 1, wherein the first illuminator includes a projector unit including a projection optical system; and
    the second illuminator includes a reflector unit including a reflective optical system.

9. The vehicle headlight according to claim 8, further comprising a third illuminator that illuminates, with a third light distribution pattern, a region at or outside a predetermined horizontal angle from an elbow point of the cutoff line of the first light distribution pattern and above an upper edge of the first light distribution pattern, wherein
    the target detector detects the target based on an image taken by an imaging unit of which an imaging range includes at least a region included in the third light distribution pattern, and
    the illumination controller performs illumination with the second illuminator in a case where the target has been detected within a region illuminated by the third light distribution pattern.

10. The vehicle headlight according to claim 9, wherein the third illuminator includes a reflector unit including a reflective optical system.

11. The vehicle headlight according to claim 1, further comprising a third illuminator that illuminates, with a third light distribution pattern, a region at or outside a predetermined horizontal angle from an elbow point of the cutoff line of the first light distribution pattern and above an upper edge of the first light distribution pattern, wherein
    the target detector detects the target based on an image taken by an imaging unit of which an imaging range includes at least a region included in the third light distribution pattern, and
    the illumination controller performs illumination with the second illuminator in a case where the target has been detected within a region illuminated by the third light distribution pattern.

12. The vehicle headlight according to claim 11, wherein the third illuminator includes a reflector unit including a reflective optical system.

* * * * *